Feb. 24, 1970    P. MLYNAR    3,497,792
HIGH VOLTAGE TO LOW VOLTAGE INVERTERS
Filed Nov. 20, 1967    3 Sheets-Sheet 1

WITNESSES:
Bernard R. Gieguay
James F. Young

INVENTOR
Peter Mlynar
BY
ATTORNEY

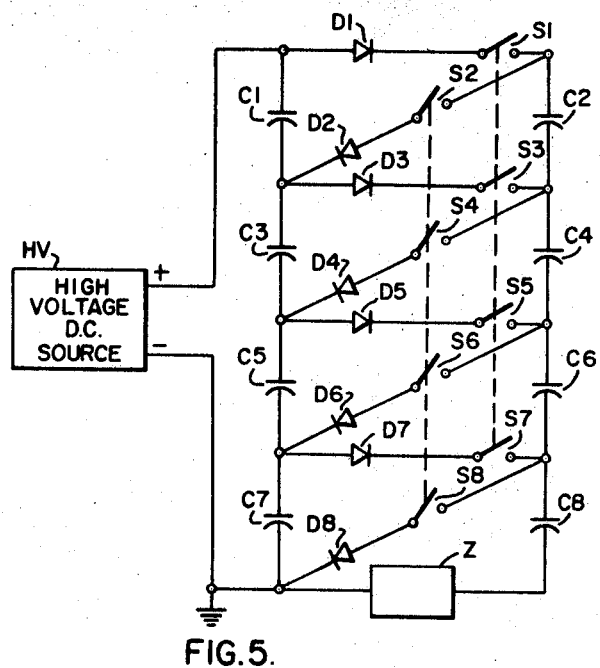
FIG. 5.
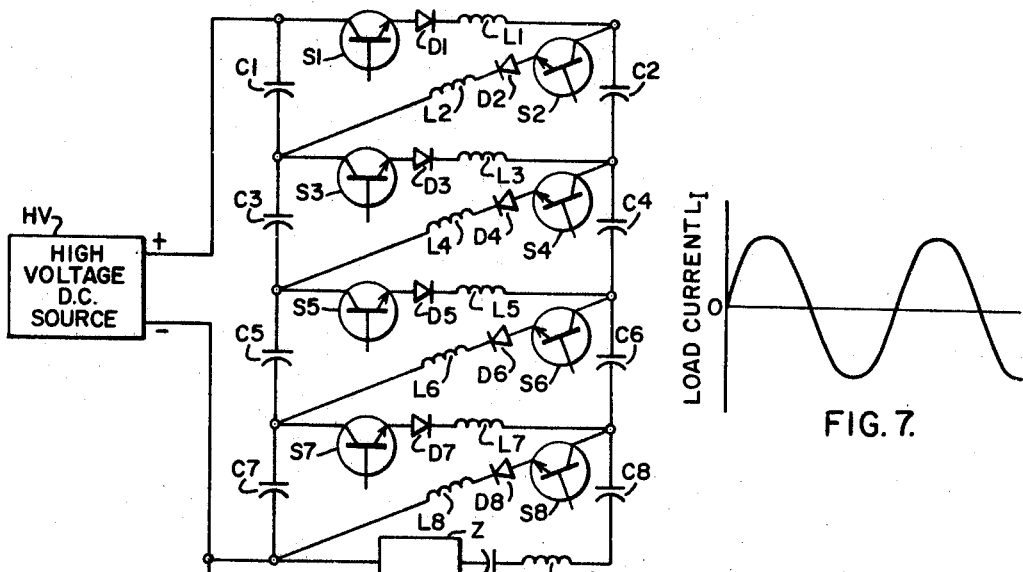
FIG. 6.
FIG. 7.

Feb. 24, 1970 P. MLYNAR 3,497,792
HIGH VOLTAGE TO LOW VOLTAGE INVERTERS
Filed Nov. 20, 1967 3 Sheets-Sheet 3

United States Patent Office 3,497,792
Patented Feb. 24, 1970

3,497,792
HIGH VOLTAGE TO LOW VOLTAGE INVERTERS
Peter Mlynar, Monroeville, Pa., assignor to Westinghouse Electric Corporation, Pittsburgh, Pa., a corporation of Pennsylvania
Filed Nov. 20, 1967, Ser. No. 684,256
Int. Cl. H02m 7/80
U.S. Cl. 321—15
6 Claims

ABSTRACT OF THE DISCLOSURE

The present disclosure relates to apparatus and methods for inverting high-voltage DC to low-voltage, high current, AC or DC. A plurality of inverter stages are utilized with each stage including capacitive and switching elements. The number of inverter stages are selected according to the degree of voltage division desired. The switching elements are selectively operative to transfer charge between capacitive elements of the stage between stages. The plurality of stages are tandemly connected across a high voltage DC source with a load circuit being connected in the last stage thereof to have applied thereto a low voltage alternating current at an increased current level with respect to the input current level. The alternating current output may be converted to DC by rectification if desired.

BACKGROUND OF THE INVENTION

The present invention relates to inverter apparatus and methods of inverting and, more particularly, to inverter apparatus and methods of inverting for inverting high-voltage direct current to lower voltage and higher current levels.

In the present technology the conversion of high-voltage DC to low-voltage DC is typically accomplished through brute force inverter techniques. That is, the high voltage DC is inverted to high voltage AC through conventional inverter apparatus and then the high voltage AC is reduced to the low desired AC voltage by means of a step-down transformer. This straight forward method is generally acceptable when inverting high voltage DC at relatively high current levels to AC at lower voltage levels. However when dealing with high DC voltage levels at relatively low current levels, for example 500 kv. DC at 1 ampere, serious disadvantages are introduced into the inverting and transforming method. Because of the high voltage applied to the primary of the step-down transformer, it is necessary that the wire size utilized in the transformer be much larger than would otherwise be necessary to handle such power levels considering the low current being carried by the wire. It is thus necessary that a transformer be utilized having a much higher kva. rating, which may be in an order of magnitude greater, than would be required for such a low current rating. This is due to the fact that a large wire diameter is required to sustain the high voltage gradients applied to the wire from the elevated voltage level being applied to the transformer.

Moreover, utilizing an inverter employing strings of semiconductor device elements or high voltage switching elements to invert the high-voltage DC to AC, requires logic circuitry which becomes quite complex to insure proper operation of the system without destructive faults. In such systems it becomes necessary to insulate the control signals and the switching elements for the total high voltage DC to ground since the total DC voltage is applied to the components. Thus, the insulation required becomes a serious problem in such high voltage systems, with the volumetric efficiency being greatly reduced as compared to that encountered at lower voltage levels.

The advent of high-voltage DC transmission systems has made it imperative that some means be provided for taking off relatively small quantities of power from the high-voltage DC lines. It would be quite uneconomical to utilize brute force inverter and transformer techniques for taping off relatively small quantities of power, such as might be required by a small community needing only a 200 kilowatt or less supply. Thus, if high voltage DC transmission is to be adaptable to supply relatively small local loads, such as for communities and factories along the transmission system, it becomes highly important that means be provided for the economic take off of small quantities of power at high efficiency levels from the high-voltage DC supply.

SUMMARY OF THE INVENTION

Broadly, the present invention provides apparatus and methods for converting high-voltage DC to lower voltage levels at higher current levels wherein a plurality of inverter stages are utilized with each inverter stage including capacitive elements and switching elements. The plurality of stages are operatively coupled across a high voltage source, and a load circuit is connected in the last stage of the plurality of stages. The switching elements of each of the stages are selectively controlled to transfer charge between the capacitive elements so as to provide increased current flow through the load at a decreased voltage level.

BRIEF DESCRIPTION OF THE DRAWING

FIG. 5 is a schematic-block diagram of another embodiment of the present invention utilizing mechanical switching elements;

FIG. 6 is a schematic-block diagram of another embodiment utilizing transistors as the switching elements;

FIG. 7 is a wave form diagram of a load current provided in FIG. 6;

DESCRIPTION OF THE PREFERRED EMBODIMENTS

As utilized herein the term "switching element" will designate various elements and devices which are operative in a switching mode to open or close a circuit. During the various switching elements as employed herein are: mechanical switches, silicon controlled rectifiers (SCR), gate controlled switches (GCS), transistors, and reverse switching rectifiers (RSR). However, it should be understood that other equivalent switching elements, mechanical or electrically controlled, can be utilized in various embodiments hereinafter to be described.

Also the term "odd switching elements" will be used to designate the group of elements S1, S3, S5, S7 . . . , and the term "even switching elements" will be used to designate the group of elements S2, S4, S6, S8 . . . . The term "odd capacitors" will be used to designate the group of capacitors C1, C3, C5, C7 . . . , and the term "even capacitors" will be used to designate the group of capacitors C2, C4, C6, C8 . . . .

Figure 1:
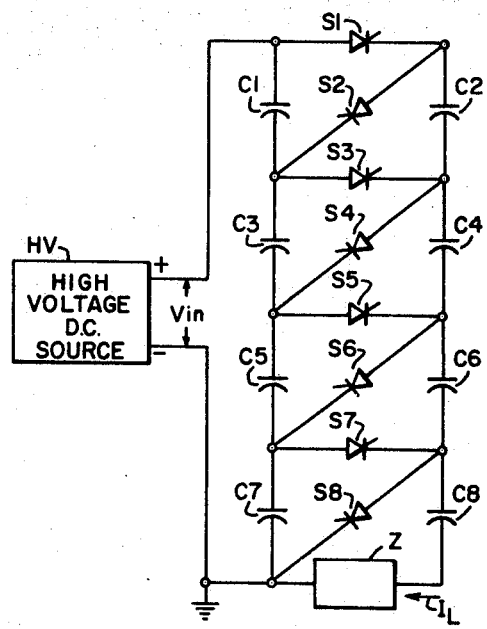
FIGURE 1 is a schematic-block diagram showing one embodiment of the present invention utilizing gate controlled switches.

Referring now to FIG. 1, a first embodiment of the present invention will be described wherein the switching element used is the gate controlled switch. As is well known, the GCS is a gate controlled device which may be turned on or turned off by the application of a pulse of the proper polarity to the gate electrode thereof. The application of a positive polarity pulse, gate positive with respect to cathode of the device, permits the conduction of current from anode to cathode thereof, while the application of a negative polarity pulse to the gate with respect to the cathode will block the conduction of current from anode to cathode thereby turning off the GCS.

In FIG. 1, a high-voltage DC source is indicated by a block HV. This high-voltage DC source HV supplies DC voltage having positive polarity at the positive line + with the other output lead being connected to ground potential. In a practical embodiment the high-voltage DC source may be supplied from a high-voltage DC transmission system. The inverter as shown in FIG. 1 is shown to include four inverter stages; however, it should be understood that other numbers of stages could be utilized depending upon the degree of voltage division and current multiplication desired to be provided to the load circuit which is indicated in FIG. 1 as an impedance Z. The first inverter stage includes capacitors C1 and C2 and switching elements S1 and S2. The second, third and fourth stages, respectively, include capacitors C3 and C4, C5 and C6, C7 and C8 and switching elements S3 and S4, S5 and S6, S7 and S8. The capacitors C1, C3, C5 and C7 are connected across the high-voltage DC source HV from the plus line to ground. The switching element S1 is connected between the top ends of the capacitors C1 and C2. The switching element S3 is connected between the junction point of the capacitors C1 and C3 and the junction point of the capacitors C2, C4. The switching element S2 is connected between the top end of the capacitor C2 and the C1, C3 junction. The switching elements S4, S6 are, respectively, connected between the C2, C4 and the C4, C6 junctions and the C3, C5 and C5, C7 junctions. The switching elements S5 and S7 are, respectively, connected between the C3, C5 and C5, C7 junctions and the C4, C6 and C6, C8 junctions. The switching element S8 is connected between the C6, C8 junction and the bottom end of the capacitor C7 at ground. The load impedance Z is connected between the bottom end of the capacitor C8 and the bottom end of the capacitor C7 at ground. The odd switching elements are all poled in the same direction so that charge may be transferred from the odd capacitors to the even capacitors of the same inverter stage. The even switching elements are poled so that charge may be transferred from the even capacitors to the odd capacitors of the next lower stage or to the load in the case of the last stage.

Figure 2:
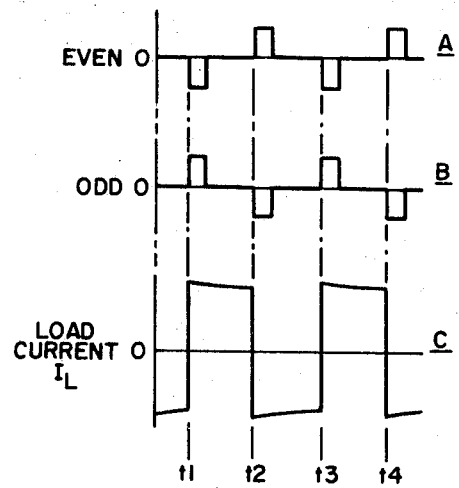
FIG. 2 shows curves A, B and C which are utilized in explaining the operation of FIG. 1.
Figure 3:
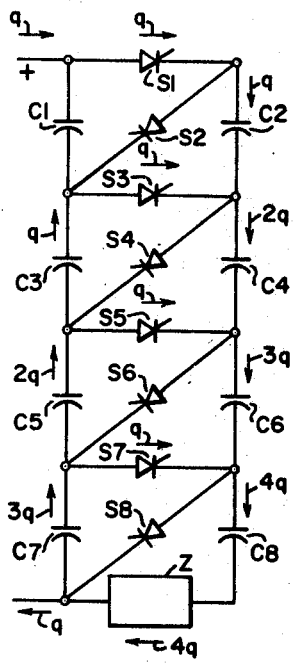
FIGS. 3 and 4 are schematic diagrams used in explaining the operation of FIG. 1.
Figure 4:
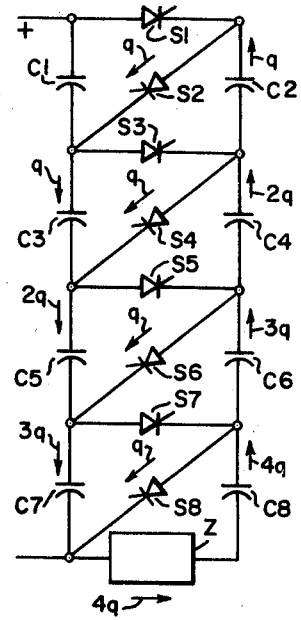

Referring now to FIGS. 2, 3 and 4, the operation of FIG. 1 will be discussed. Assume that the system is in steady-state operation and that two units of charge 2Q are supplied by the source HV. Also assume that each of the capacitors have substantially the same capacitance. Thus each of the odd capacitors will receive a unit charge Q and each of the even capacitors will receive a unit charge Q. Due to the transfer of charge within the same inverter stage and between different inverter stages there will be various incremental changes in charge level as indicated by the letter $q$ as shown in FIGS. 3 and 4 so that either one increment $q$, two increments $2q$, 3 increments $3q$ or four increments $4q$ are transferred to or from a given capacitor of the various stages during a half cycle of operation.

Curves A and B of FIG. 2 show the switching sequences fort he switching elements of FIG. 1. At the time $t1$, a positive pulse is applied to the odd switching elements and a negative pulse is applied to the even switching elements; thus, the odd switching elements are turned on and the even switching elements are turned off. This is the state illustrated schematically in FIG. 3, with the odd switching elements transferring charge therethrough. At the time $t2$, the even switching elements are turned on and the odd switching elements are turned off, with charge being transferred therethrough to the next lower inverter stage. This state is illustrated in FIG. 4.

Tracing a typical incremental charge $q'$ through the various stages of FIG. 1, first, at the time $t1$ when the switching element S1 is turned on the charge increment $q'$ is transferred from the source at the capacitor C1 to the capacitor C2. At the time $t2$, the increment charge $q'$ that is being traced is transferred from the capacitor C2 to the capacitor C3 of the next lower stage. At the time $t3$ the even switches are turned off and the odd switches are turned on, with the charge increment $q'$ being transferred from the capacitor C3 to the capacitor C4 of the same stage. At the time $t4$ the charge increment $q'$ is transferred from the capacitor C4, with the even switching elements being turned on at the time $t4$ and the odd switching elements being turned off, to the capacitor C5 of the next lower stage. During subsequent switching cycles the charge increment $q'$ is transferred from the capacitor C5 through the switching element S5 to the capacitor C6; from the capacitor C6 through the switching element S6 to the capacitor C7; from the capacitor C7 through the switching element S7 to the capacitor C8; from the capacitor C8 through the switching element S8 and back to the source HV. Thus it can be seen that incremental quantity of charge $q'$ travels from the load source through the various inverter stages back to the supply. Each time an incremental of charge $q'$ moves from one capacitor to the next one it loses potential energy. As can be seen from FIGS. 3 and 4, four increments of charge $4q$ are moved to lower potential levels during each half cycle of the output load current $I_L$ as shown in curve C of FIG. 2. This results in current multiplication through the load Z and voltage reduction appearing across the load Z.

As can be seen in FIG. 3, during one half cycle capacitor C8 has transferred thereto four increments of charge $4q$ which is transferred through the load Z. A load current $I_L$, as shown in curve C of FIG. 2, is developed in response thereto during the time period $t1$ to $t2$. During the next half cycle $t2$–$t3$, with the even switching elements conductive $q$ charge flow $4q$ is supplied to the load Z, one increment of capacitor C8 through switch S8 and three increments $3q$ being supplied from the capacitor C7. Thus during each cycle of operation one charge increment $q$ is supplied from the source and returned thereto as shown in FIG. 3, while the load Z sees a change of four increments $4q$ of charge due to the current multiplier effect of the four inverter stages. Thus, the load Z sees an average alternating current $L_{L(AV)}$ which is eight times that of the average input current $L_{in(AV)}$. This is evident in that the average input current be defined as:

$$I_{in(AV)} = \frac{q}{T}$$

The average output current may be defined by:

$$I_{L(AV)} = \frac{4q}{\frac{T}{2}} = \frac{8q}{T}$$

$$I_{L(AV)} = 8I_{in(AV)}$$

where $q$ is a fixed quantity of charge and T is the period of one cycle.

In the system as shown in FIG. 1, the average input power must equal the average output power, therefore the average voltage as seen by the load Z must be equal to $V_{in/8}$ since there is average current multiplication by a factor of 8. The load current waveform is shown in curve C of FIG. 2 and is shown to be substantially a square wave, however, with the current $I_L$ decreasing slightly from the beginning of the half cycle to the end of the half cycle due to the partial discharge of the capacitors.

It can thus be seen that the system as shown in FIG. 1 provides the desired reduction in voltage to a more utilizable stage while also providing current multiplication as desired. The following advantages also should be noted. Each of the switching elements S1 through S8 carries only an average current which is equal to the current supplied to it from the DC source HV. The high voltage DC $V_{in}$ is substantially uniformly distributed over the series connected capacitors thereby eliminating severe voltage gradients over any of the individual capacitors or components. Also none of the elements in the inverter, neither the switching elements nor capacitors, has applied thereto the entire DV voltage $V_{in}$ to ground. Additional advantages will be discussed below with reference to various other embodiments of the present invention which will now be described.

Referring now to FIG. 5, another embodiment is shown wherein mechanical switches are utilized as the switching elements of the inverter system rather than the gate controlled switches as shown in FIGS. 1, 3 and 4. In FIG. 1 the odd mechanical switches S1, S3, S5 and S7 are mechanically gauged so as to be opened and closed at the same time. Similarly the even mechanical switches S2, S4, S6 and S8 are mechanically gauged to open and close together. Dides D1 through D8 are respectively connected in series with the mechanical switches S1 through S8. The diodes D1 through D8 are poled so as to provide a unidirectional current path in the same direction as for the respective gate controlled switches of FIG. 1. The diodes D1 through D8 are required in the system of FIG. 8 to prevent reverse currents from passing through the switches once closed in a direction other than the desired charge flow direction and force current through the load Z. These diodes are not required in the embodiment of FIG. 1 since the gate controlled switch is inherently a unidirectional device permitting only current flow from anode to cathode. Structure and operation of the system of FIG. 5 is otherwise identical to that of FIGS. 1, 3 and 4 with similar components being given the same reference designations. The output current waveform to the load Z of FIG. 5 is the same as shown in curve C of FIG. 2.

FIG. 6 shows another embodiment of the present invention wherein transistors are utilized as the switching elements and wherein a sinusoidal output load current is provided as shown in FIG. 7. The transistor switching elements S1 through S8 are shown to be of the NPN conductivity type; however, it should be understood that transistors of the opposite conductivity type PNP could be utilized with the appropriate changes in polarity. As in FIG. 5, diodes D1–D8 are connected in series, respectively, with each of the transistors S1 through S8 to prevent the flow of reverse current through any of the junctions of the respective transistors. Inductors L1 through L8 are, rspectively, connected in series with the diodes D1 through D8. The inductors L1, L3, L5 and L7 are connected between the cathode electrodes of the diodes D1, D3, D5 and D7 and top ends of the capacitors C2, C4, C6 and C8, respectively. The inductors L2, L4, L6 and L8 are connected between the cathode electrodes of the diodes D2, D4, D6 and D8 and the top ends of the capacitors C3, C5, C7 and ground, respectively.

A filter circuit, including an inductor $Lf$ and a capacitor $Cf$, is connected in series with the load impedance Z so as to filter the output current and provide a substantially sinusoidal output current waveform as shown in FIG. 7. The sinusoidal output current is useful if one wishes to transformer couple the output load current to other loads. The inductors L1 through L8 in series with the transistors S1 through S8 shape the current through the transistors so to appear as half wave rectified sinusoids. This is highly desirable from the standpoint of turning off the even or odd transistor groups at the end of a half cycle. Moreover, the inductors L1 through L8 impede any switch through current which might otherwise occur when the transistors S1 through S8 are in the transition period between full on and full off conditions.

The operation of the system of FIG. 6 is otherwise similar to that of FIG. 1 with gating waveforms being provided to the even and odd switching elements such as shown in curves A and B of FIG. 2 so that the even and odd transistor switching elements are switched on and off similarly to the even and odd gate controlled switches of FIG. 1. The use of the inductors L1 through L8 and the filter circuit $Lf$–$Cf$ provides, however, a sinusoidal output current as shown in FIG. 7 which may be highly desirable for certain applications.

Figure 8:
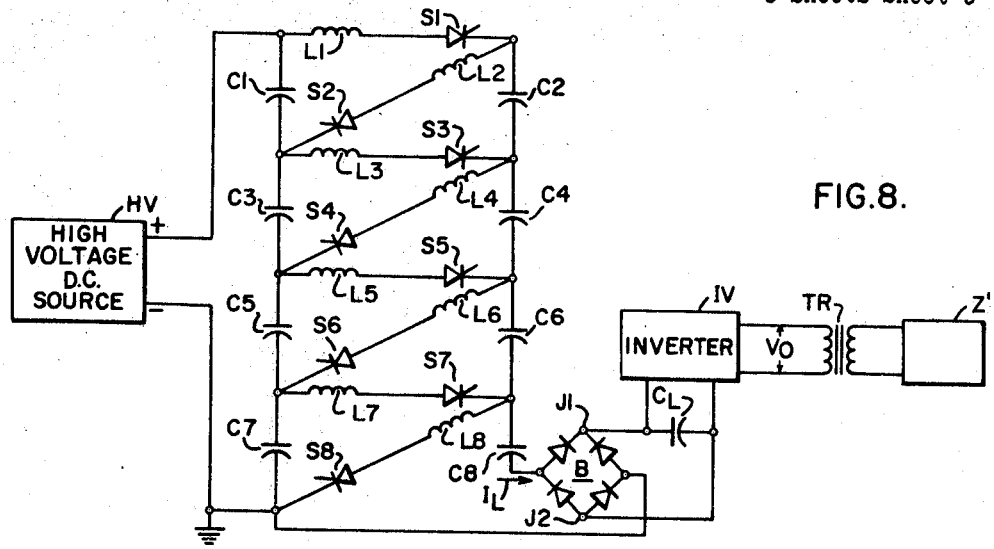
FIG. 8 is a schematic-block diagram of another embodiment of the present invention utilizing controlled rectifiers as the switching elements.

FIG. 8 shows another embodiment of the present invention wherein silicon controlled rectifiers are used as the switching elements therefor. Unlike gate controlled switches and transistors, silicon controlled rectifiers do no have a turn off capability. That is, once anode to cathode current is conducted by the device in order for the device to terminate conduction the anode-cathode current must be reduced to substantially zero. This is accomplished in the circuitry of FIG. 8 through a resonant charging technique as will be now described. As in FIG. 5 inductors L1 through L8 are connected, respectively, in series with the controlled rectifiers S1 through S8. Thus a substantially sinusoidal half wave rectified current waveform will flow through each of the controlled rectifiers S1 through S8.

Figure 9:
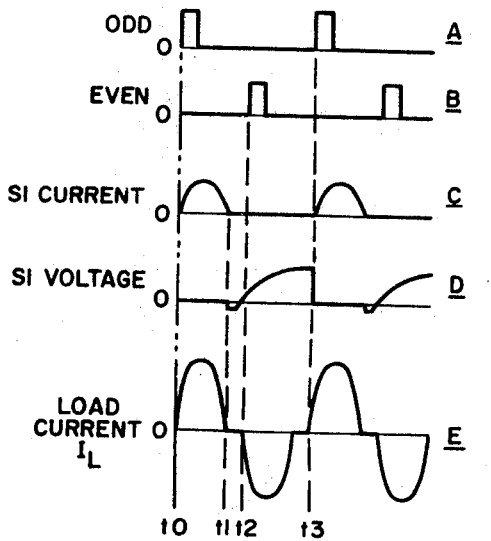
FIG. 9 shows curves A, B, C, D and E utilized in explaining the operation of FIG. 8.

Referring also to FIG. 9, curves A and B thereof show the turn on gating pulses that are respectively applied to the odd and even switching elements to gate them on respectively. Hence at the time to, as shown in FIG. 9, a pulse is applied to each of the odd controlled rectifiers turning on these devices. The current waveform flowing through the device S1, for example, is shown in curve C of FIG. 9 and is shown to be substantially a sinusoidal half wave rectified waveform. The coil L1 causes the current to slowly increase and begin to decrease as charge $q$ is transferred to the capacitor C2 via the conductor L1 and switch S1. At the time $t1$ the current to the switch S1 has gone substantially to zero. However, due to the reactive elements as seen by the current through the switch S1, a resonant condition will be set up with the coil L1 being selected to resonate with the associated inverter capacitors C1, C2 and any other associated capacitances so that the current through the switch S1 and inductor L1 will tend to reverse directions. This will reverse the voltage appearing across the controlled rectifier S1 thereby reverse biasing it and turning it off. The voltage appearing across the controlled rectifier S1 from anode to cathode is shown in curve D of FIG. 9. From this curve it can be seen that the anode to cathode voltage is substantially zero while the controlled rectifier S1 is conductive; however, at the time $t1$ a resonant condition is set up between the inductor L1 and the associated capacitors and the current tends to reverse and the voltage across the controlled rectifier S1 is reversed, with the anode going negative with respect to the cathode so that the device is reverse biased and will turn off. The load current $I_L$ during the time period $t0$–$t1$ is shown in curve E of FIG. 9, and it is shown to be of substantially sinusoidal wave shape. However as previously explained the load current $I_L$ will be amplified compared to the input current due to the multiplying action of the four inverter stages of FIG. 8.

With the odd switching elements all extinguished at the time $t2$, the even switching elements may be turned on by the application of a pulse to each of the gate electrodes thereof as shown in curve B of FIG. 9. Thus a half wave sinusoidal waveform of current will pass therethrough each of the even switching elements with the device being turned off as current therethrough reaches zero by the resonant turn off technique as described above. Beginning at the time $t2$, the negative half cycle of the load current $I_L$ starts with the half wave sinusoidal waveform being as shown in curve E of FIG. 9.

Once the odd switching elements are turned off, shortly after the time $t1$ the voltage across the odd elements begins to build up in the forward direction as shown in curve D of FIG. 9. Thus the odd devices will be forward biased to be turned on at a time $t3$ beginning the next half cycle of the operation.

In addition to the advantage of using silicon controlled rectifiers not having a turn off characteristic, the resonant turn off technique permits the operation of the inverter at relatively high frequencies as compared to normal line frequency. This frequency of operation may be in the order of 10 kHz. This provides substantial advantages in that the various capacitors C1 through C8 may have lower capacitance values than would otherwise be required at the same voltage level but at a 60 Hz. line frequency. An additional advantage is that at the high frequency of the output load current $I_L$ a relatively small transformer could be utilized to transform this output into different voltage levels providing very economical conversion of the voltage levels.

Another feature of the present invention is illustrated in FIG. 8 wherein the load current $I_L$ which is at a multiplied magnitude as compared to the current supplied by the DC source HV and at a decreased voltage level is applied to a full wave rectifier bridge B. The bridge includes four diodes so that a unidirectional full wave rectified output appears across its output junctions J1 and J2. A load filter capacitor CL is connected across the junction J1 and J2 to filter the full wave rectified output so that a filtered unidirectional voltage is applied to an inverter IV. Due to the use of the four stage inverter system of FIG. 8, the average voltage appearing across the load capacitor CL is only approximately ⅛ that of the DC source voltage $V_{in}$. However, the current level due to the current multiplier action has an average current of 8 times that of the current from the DC source HV. Thus a conventional inverter IV may be utilized operating at more ideal voltage and current levels as compared to the very high voltage $V_{in}$ and low current. The conventional inverter may then provide for efficient inversion of the unidirectional input thereto to an AC output. The AC output of the inverter IV is then applied to a transformer TR which may comprise a step down transformer. Across the secondary of the transformer TR is connected a load impedance Z'.

Thus the multiple stage inverter as shown in FIG. 8 may be utilized to convert the high voltage low current DC to a more utilizable lower voltage, high current AC, which is rectified to provide DC voltage at a relatively high current level. This DC voltage is selected so that it may be inverted economically via the inverter IV to AC and may be further processed via a transformer which becomes economical at the current and voltage level of the output of the inverter IV for subsequent utilization by the load impedance Z'.

Figure 10:
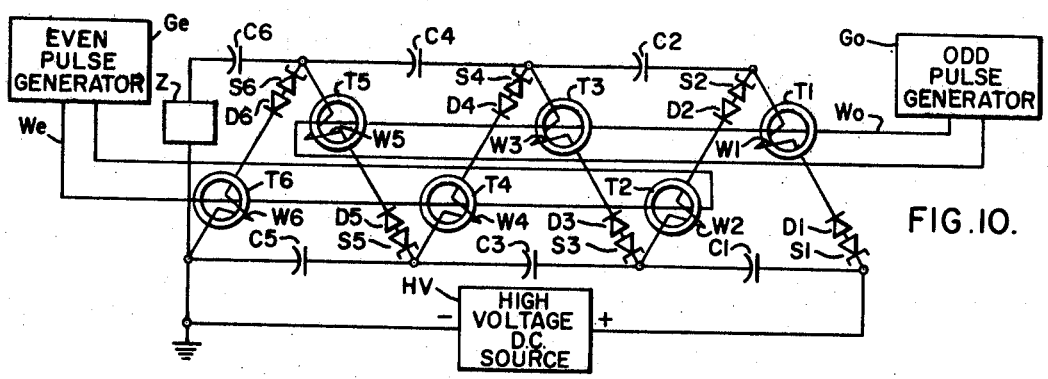
FIG. 10 shows another embodiment of the present invention utilizing reverse switching rectifiers as the switching elements thereof.

Referring now to FIG. 10, another embodiment of the present invention is shown utilizing reverse switching rectifiers as the switching elements thereof. The reverse switching rectifiers (RSR) is a two terminal device and has the characteristic that in one direction, from anode to cathode it acts as a normal rectifying device, while in reverse direction, from cathode to anode, the device will block until its threshold voltage is reached. Once the cathode to anode voltage exceeds this threshold voltage, the RSR switches from a high impedance to a low impedance state from cathode to anode thereby acting as a switch. Connected in series with each of the reverse switching rectifiers S1 through S6 of FIG. 10 are diodes D1 through D6 which are poled in a direction to prevent reverse currents, from anode to cathode, to flow through the respective switches S1 through S6. Only three inverter stages are shown in FIG. 10 for the sake of simplicity and hence the average current appearing through the load Z will be approximately six times the average current as supplied from the DC input source HV with the average voltage being reduced by a factor of six.

Since the reverse switching rectifiers are switched in response to its cathode to anode voltage exceeding a threshold vale, the device may be triggered in response to a differential voltage being applied thereacross. In FIG. 10 this is accomplished through the use of pulse transformers T1 through T6 respectively associated with the reverse switching rectifiers S1 through S6. The secondary windings W1 through W6 of the respective pulse transformers T1 through T6 are connected in series with switching elements S1 and diodes D1 through S6 and D6. The primary winding for the even pulse transformers T1, T3, T5 comprises a winding Wc which is connected to an odd pulse generator Go and which passes through each of the transformers T1, T3 and T5 to be inductively coupled to secondary windings W1, W3 and W5, respectively, thereof. The even pulse transformers T2, T4 and T6 are supplied with a primary winding We which is connected to an even pulse generator Ge. In response to an output pulse from the odd pulse generator Go, a voltage is induced in each of the secondary windings W1, W3 and W5 so that a voltage of such a polarity is applied across the odd reverse switching rectifiers of sufficient magnitude to cause them each to switch and permit the transfer of charge to the respective capacitors. Due to the inductance in the secondary windings W1, W3 and W5, respectively, connected in series with the reverse switching rectifiers S1, S3 and S5, a resonant circuit is set up with the capacitors in the circuit and the conduction of the devices S1, S3 and S5 is determined by the resonant turn off mechanism as described above. The RSR's are thus reset for the next half cycle of operation. With the odd switching elements turned off, the even switching elements may be turned on through a pulse supplied by the even pulse generator Ge, which causes a sufficient voltage to turn on the even switching elements which conduct current therethrough, with the even switching elements turning off when a reverse voltage is applied thereacross due to the resonance effect. A complete cycle of operation is thus terminated and the odd pulse generator Go may then supply another output pulse to instigate the next half cycle of operation.

Various embodiments of the inverting system have been described above which are capable of inverting high voltage DC at low current levels to low voltage AC at high current levels. In the described apparatus various switching elements have been shown including: mechanical switches; devices having turn off characteristics, such as, transistors and gate controlled switches; and devices not having a turn off characteristic such as silicon controlled rectifiers and reverse switching rectifiers which are turned off by the resonant turn off technique as taught herein. The use of such inverter systems would be highly advantageous with high voltage DC transmission systems for the taking off of small quantities of power for local distribution, and it would be highly economical as compared to conventional inverter schemes.

Although the present invention has been described with a certain degree of particularity, it should be understood that the present disclosure has been made only by way of example and that numerous changes in the details of construction and the combination of parts, elements and components can be resorted to without departing from the spirit and the scope of the present invention.

I claim:

1. In an inverter system for converting high voltage DC from an input source to low voltage to be supplied to a load, the combination of:

a plurality of inverter stages operatively connected across said input source to supply increased current to said load at a reduced voltage than said input source, each of said stages including, first and second capacitance means, and first and second switching elements comprising first and second semiconductor devices respectively which must be reverse biased to be deactivated, said first capacitance means of each of said stages operatively connected in series across said input source, said second capacitance means of each of said stages operatively connected in series with said load, said first switching element of each of said stages for operatively connecting said first and second capacitance means of a given stage and being selectively operative to transfer charge to said second capacitance means of the given stage, said second switching element of each of said stages for operatively connecting said second capacitive means of a given stage to the first capacitance means of the next lower of said stages and being operative to transfer charge to said first capacitance means of the next lower of said stages, all of said first switching elements being activated at a first time to transfer charge and all of said second switching elements being activated at a second time to transfer charge, and inductance means operatively connected in series with each of said first and second controlled rectifier devices to provide a resonant circuit for current flow through said controlled rectifier devices so that these devices are reverse biased and deactivated after a predetermined time after conduction.

2. The combination of claim 1, wherein:
said first and second switching elements comprise respectively, first and second controlled rectifier devices.

3. The combination of claim 1, wherein:
said first and second switching elements comprise, respectively, first and second reverse switching rectifiers.

4. The combination of claim 3 including:
first and second pulse transformer means, respectively, connected in series with said first and second reverse switching rectifiers and in response to a pulse applied respectively thereto turning on said reverse switching rectifiers at said first and second times, respectively.

5. In an inverter system for converting high voltage DC from an input source to low voltage to be supplied to a load, the combination of:

a plurality of inverter stages operatively connected across said input source to supply increased current to said load at a reduced voltage than said input source, each of said stages including, first and second capacitance means, and first and second switching elements comprising first and second transistor, respectively, said first capacitance means of each of said stages operatively connected in series across said input source, said second capacitance means of each of said stages operatively connected in series with said load, said first switching element of each of said stages for operatively connecting said first and second capacitance means of a given stage and being selectively operative to transfer charge to said second capacitance means of the given stage, said second switching element of each of said stages for operatively connecting said second capacitive means of a given stage to the first capacitance means of the next lower of said stages and being operative to transfer charge to said first capacitance means of the next lower of said stages, inductance means operatively connected in series with each of said transistors for causing a substantially sinusoidal half wave rectified current to pass thereto, and a filter circuit operatively connected in series with said load for developing a sinusoidal output current through said load.

6. A method of converting high voltage DC to low voltage comprising the steps of:

providing charge from a high voltage DC source, storing charge on a plurality of storage elements including first and second groups of storage elements, first transferring charge from said first group to said second group of storage elements and through said load during a first half cycle by completing a circuit between respective ones of said first and second groups of storage elements through the activation of a first group of switching elements during said first half cycle, second transferring charge from said second group to said first group of storage elements at a lower potential level and through said load during a second half cycle by completing a circuit between respective second and first storage elements through the activation of a second group of switching elements during said second half cycle, and setting up a resonant condition with said storage elements to terminate the transfer of charge after a predetermined period.

References Cited

UNITED STATES PATENTS

| | | | |
|---|---|---|---|
| 2,047,463 | 7/1936 | Dubilier | 307—110 |
| 2,219,292 | 10/1940 | Bouwers | 321—15 |
| 2,256,859 | 9/1941 | Bouwers | 321—15 X |
| 2,773,200 | 12/1956 | Guggi | 321—15 X |
| 3,320,513 | 5/1967 | Cleland | 321—15 |
| 3,331,008 | 7/1967 | Bedford | 321—2 |
| 3,337,787 | 8/1967 | Joseph | 321—2 |
| 3,387,201 | 6/1968 | Greenberg et al. | 321—2 |
| 3,418,558 | 12/1968 | Morgan et al. | 321—47 X |

LEE T. HIX, Primary Examiner

W. H. BEHA, Jr., Assistant Examiner

U.S. Cl. X.R.

307—110; 320—1